United States Patent
McCloskey et al.

(10) Patent No.: US 11,074,708 B1
(45) Date of Patent: Jul. 27, 2021

(54) DARK PARCEL DIMENSIONING

(71) Applicant: Hand Held Products, Inc., Fort Mill, SC (US)

(72) Inventors: Scott McCloskey, Minneapolis, MN (US); Michael Albright, Minneapolis, MN (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 16/735,189

(22) Filed: Jan. 6, 2020

(51) Int. Cl.
| | |
|---|---|
| *G06K 9/00* | (2006.01) |
| *G06T 7/62* | (2017.01) |
| *G01B 11/25* | (2006.01) |
| *G06T 7/11* | (2017.01) |

(52) U.S. Cl.
CPC ............... *G06T 7/62* (2017.01); *G01B 11/25* (2013.01); *G06T 7/11* (2017.01); *G06T 2207/10028* (2013.01)

(58) Field of Classification Search
CPC ... G06T 7/62; G06T 7/11; G06T 2207/10028; G01B 11/25
See application file for complete search history.

(56) References Cited

U.S. PATENT DOCUMENTS

| | | | | |
|---|---|---|---|---|
| 6,878,896 | B2 * | 4/2005 | Braginsky | B07C 7/005 |
| | | | | 209/546 |
| 8,489,232 | B2 * | 7/2013 | Mishra | G06Q 10/08 |
| | | | | 700/230 |
| 9,245,344 | B2 | 1/2016 | Shim et al. | |
| 9,987,665 | B2 * | 6/2018 | Zatopek | B07C 3/14 |
| 2004/0240754 | A1 | 12/2004 | Smith et al. | |
| 2009/0232388 | A1 * | 9/2009 | Minear | G06T 3/0075 |
| | | | | 382/154 |
| 2010/0145653 | A1 * | 6/2010 | Christoph | G01B 21/04 |
| | | | | 702/152 |
| 2013/0121564 | A1 * | 5/2013 | Kitamura | G01B 11/24 |
| | | | | 382/154 |

(Continued)

FOREIGN PATENT DOCUMENTS

| | | |
|---|---|---|
| CN | 108413864 A | 8/2018 |
| CN | 108648221 A | 10/2018 |
| WO | 20081044096 A1 | 4/2008 |

OTHER PUBLICATIONS

Sheng et al., Shadow Detection on 3D Point Cloud, 2016, [online article] [retrieved on Mar. 27, 2020] retrieved from the Internet URL: https://www.semanticscholar.org/paper/Shadow-Detection-on-3D-Point-Cloud-Sheng-Jenkins/fc9d62d7fbea9f5c24039f21c0da8df72b692223, 5 pages.

(Continued)

*Primary Examiner* — Gregory M Desire
(74) *Attorney, Agent, or Firm* — Alston & Bird LLP

(57) ABSTRACT

Various embodiments described herein relate to techniques for computing dimensions of an object. In this regard, a dimensioning system converts points cloud data associated with an object into a density image for a scene associated with the object. The dimensioning system also segments the density image to determine a void region in the density image that corresponds to the object. Furthermore, the dimensioning system determines, based on the void region for the density image, dimension data indicative of one or more dimensions of the object.

17 Claims, 14 Drawing Sheets

(56) References Cited

U.S. PATENT DOCUMENTS

2015/0279087 A1* 10/2015 Myers ................... G06T 7/0002
                                                                       345/420
2017/0308736 A1* 10/2017 Sharma ................ G06K 9/4652
2019/0195616 A1*  6/2019 Cao ........................ G01B 11/22

OTHER PUBLICATIONS

Deng et al., "Amodal Detection of 3D Objects: Inferring 3D Bounding Boxes from 2D Ones in RGB-Depth Images," 2017 IEEE Conference on Computer Vision and Pattern Recognition (CVPR), 2017, pp. 398-406, doi:10.1109/CVPR.2017.50.
Extended European Search Report issued in European Application No. 20217927.1 dated May 11, 2021, 10 pages.
Mahler et al., "GP-GPIS-OPT: Grasp planning with shape uncertainty using Gaussian process implicit surfaces and Sequential Convex Programming," 2015 IEEE International Conference on Robotics and Automation (ICRA), 2015, pp. 4919-4926, doi:10.1109/ICRA.2015.7139882.

\* cited by examiner

```
                                    ┌─ 1300
                                   ↙
```

| CONVERTING, BY A DEVICE COMPRISING A PROCESSOR, POINT CLOUD DATA ASSOCIATED WITH AN OBJECT INTO A DENSITY IMAGE FOR A SCENE ASSOCIATED WITH THE OBJECT 1302 |

| SEGMENTING, BY THE DEVICE, THE DENSITY IMAGE TO DETERMINE A VOID REGION IN THE DENSITY IMAGE THAT CORRESPONDS TO THE PARCEL 1304 |

| DETERMINING, BY THE DEVICE, DIMENSION DATA FOR THE PARCEL BASED ON THE VOID REGION FOR THE DENSITY IMAGE 1306 |

DARK PARCEL DIMENSIONING

TECHNICAL FIELD

The present disclosure relates generally to depth-sensing technology, and more particularly to automated dimensioning systems.

BACKGROUND

In material handling environments (e.g., distribution centers, shipping centers, warehouses, factories, etc.), it is often desirable to measure dimensions of an object (e.g., a package, a parcel, a box, a case, a carton, a pallet, etc.). Applicant has identified a number of deficiencies and problems associated with conventional methods of measuring dimensions of an object. Through applied effort, ingenuity, and innovation, many of these identified problems have been solved by developing solutions that are included in embodiments of the present disclosure, many examples of which are described in detail herein.

BRIEF SUMMARY

In accordance with an embodiment of the present disclosure, a system comprising a processor and a memory is provided. The memory stores executable instructions that, when executed by the processor, cause the processor to convert point cloud data associated with a parcel into a density image for a scene associated with the parcel. The executable instructions further cause the processor to segment the density image to determine a void region in the density image that corresponds to the parcel. Furthermore, the executable instructions cause the processor to determine, based on the void region for the density image, dimension data indicative of one or more dimensions of the parcel.

In accordance with another embodiment of the present disclosure, a computer-implemented method is provided. The computer-implemented method provides for converting, by a device comprising a processor, point cloud data associated with a parcel into a density image for a scene associated with the parcel. The computer-implemented method also provides for segmenting, by the device, the density image to determine a void region in the density image that corresponds to the parcel. Furthermore, the computer-implemented method provides for determining, by the device, dimension data for the parcel based on the void region for the density image.

In accordance with yet another embodiment of the present disclosure, a computer program product is provided. The computer program product at least one computer-readable storage medium having program instructions embodied thereon, the program instructions executable by a processor to cause the processor to convert point cloud data associated with a parcel into a density image for the parcel. The program instructions are also executable by the processor to cause the processor to segment the density image to determine a void region in the density image that corresponds to the parcel. Furthermore, the program instructions are executable by the processor to cause the processor to determine, based on the void region for the density image, dimension data indicative of one or more dimensions of the parcel.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 13 illustrates a flow diagram for facilitating dimensioning of an object, in accordance with one or more embodiments described herein.

DETAILED DESCRIPTION

Figure 1:
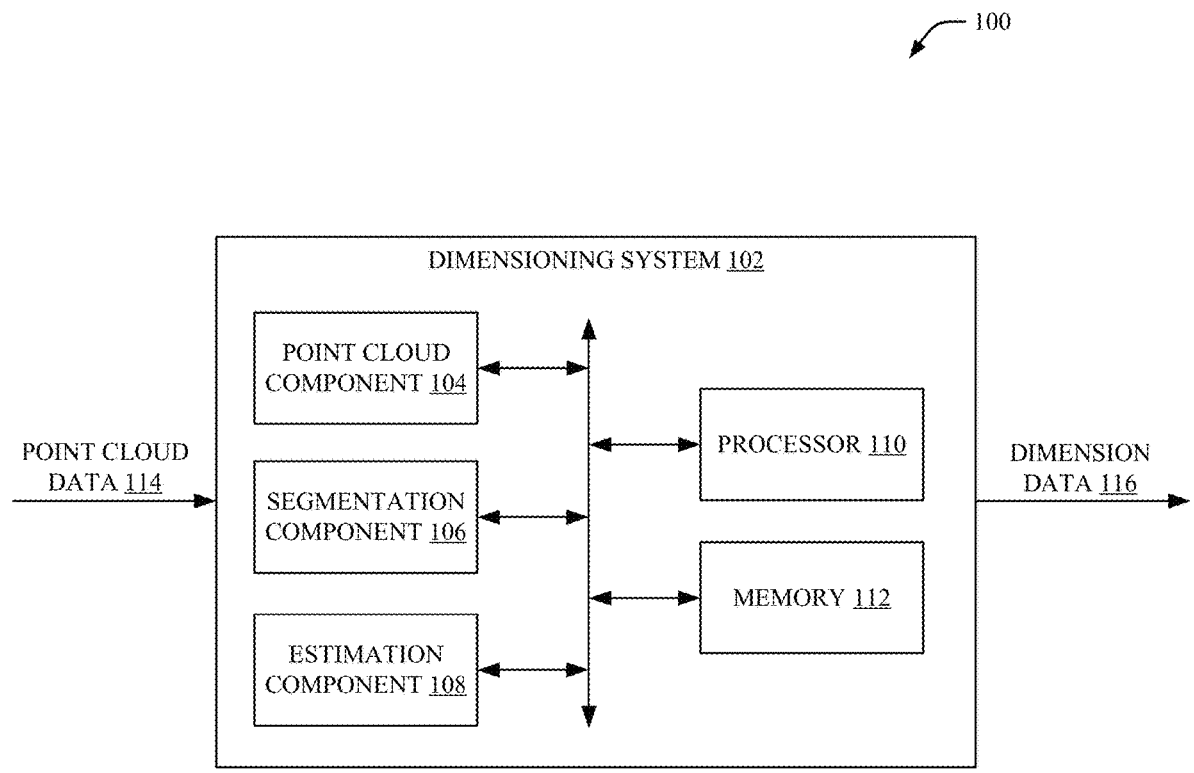
FIG. 1 illustrates a dimensioning system, in accordance with one or more embodiments described herein.

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

In material handling environments (e.g., distribution centers, shipping centers, warehouses, factories, etc.), it is often desirable to measure dimensions of an object (e.g., a package, a parcel, a box, a case, a carton, a pallet, etc.). For example, a cost to ship a package is generally computed based on dimensions of the package. A dimensioning device (e.g., a dimensioner) is a device that can be employed to estimate dimensions of an object. In a material handling environment, where objects of different sizes are often processed at a large scale, a dimensioning device can provide a fast way to calculate dimensions of multiple objects. However, it is often desirable to achieve faster processing speed of a dimensioning device and/or improved accuracy for a dimensioning device to, for example, increase overall productivity of the material handling environment. Moreover, for certain types of objects (e.g., a dark object such as a dark parcel), it is often difficult for a dimensioning device to determine dimensions of the object. For example, active illumination (e.g., from structured light or a time of flight camera) is mostly absorbed by dark objects, with not enough light being returned to a camera sensor to, for example, decode a structure of light or a measure of time of return. A "dark object" can be, for example, an object that is absorptive at the wavelength(s) of the light projected at the object. In a non-limiting example, a "dark object" can be an object that absorbs projected light with a wavelength equal to approximately 850 nm. As such, it is also desirable to accurately calculate dimensions for a wide variety of objects including, for example, dark objects. Thus, to address these and/or other issues, novel dimensioning of an object is disclosed herein. In this regard, with the novel dimensioning of an object disclosed herein, calculation of dimensions can be improved for a wide variety of objects as compared to conventional dimensioning devices.

In an embodiment, an object can be measured by analyzing depth data captured on the object. For example, three-dimensional (3D) points in a point cloud which fall on a surface of the object can be captured by one or more 3D cameras. The 3D points in the point cloud can also be analyzed, for example, using one or more dimensioning techniques. Furthermore, in an aspect, a void region (e.g., a hole) in the depth data can be employed to facilitate calculation of dimensions for the object. An adjacent region of the void region caused by shadowing of structured light generated by structured light projector can also be employed to facilitate calculation of dimensions for the object. For instance, a geometry of the void region and a geometry of the adjacent region can be employed to facilitate calculation of dimensions for the object. In an aspect, a shape and/or a size of the void region can be analyzed to infer dimensions of the object.

In another embodiment, a 3D measurement of a scene that contains an object can be performed to generate a 3D point cloud. For example, the scene that contains the object can be scanned by an imaging device to obtain the 3D point cloud. A segmentation process can also be performed to detect the void region (e.g., the void region in a ground plane) caused by the object. A boundary of the object can also be segmented. Furthermore, an estimation process can be performed to estimate a size of the object from a shape and/or a size of the segmented void region. In certain embodiments, the segmentation process can include a plane fitting process to determine a mathematical equation for a two-dimensional (2D) plane (e.g., a ground plane) that describes a surface upon which the object is placed. The mathematical equation can be employed, for example, to select a subset of 3D points in the 3D point cloud that are approximate and/or on the 2D plane. In an aspect, the 3D point cloud can be transformed into a coordinate system where the 2D plane lies in an X-Y plane and a positive Z axis can correspond to a vertical direction above the 2D plane. In another aspect, 3D points that are located within a threshold distance of the 2D plane can be selected. For example, 3D points with a Z coordinate that corresponds to a range $-T<Z<T$ can be selected, where T represents the threshold distance. Resulting 3D points can constitute 3D points from the 2D plane. The resulting 3D points can also be projected into the 2D plane (e.g., by removing a Z coordinate of the resulting 3D points and retaining only an X coordinate and a Y coordinate for the resulting 3D points) to form a 2D point cloud representation of the 3D points from the 2D plane.

The 2D point cloud representation can be employed to detect and/or segment a void region from the 2D point cloud representation. In certain embodiments, 2D points of the 2D point cloud representation can be converted into a density image to detect and/or segment a void region from the 2D point cloud representation. The density image can be a 2D image that provides a density of 2D points across the 2D plane. In an aspect, the 2D point cloud representation can be divided into a grid of square data bins (e.g., a regularly-shaped grid of square data bins) and a number of 2D points located within each data bin can be determined. In another aspect, the density image can be represented by black pixels and white pixels, where the white pixels correspond to a void region of the density image and the black pixels correspond to a non-void region of the density image. One or more morphological operations can also be applied to the density image to, for example, modify an appearance of one or more portions of the density image (e.g., smooth one or more portions of the density image, reduce a number of irregularities associated with one or more portions of the density image, etc.). One or more morphological operations can also be applied to the density image to additionally or alternatively fill in certain void regions that correspond to a certain size (e.g., to fill in small void regions). In certain embodiments, one or more void regions of the density image can be removed from an outer boundary of the density image. Furthermore, one or more void regions can be removed inward from the outside region of the density image to remove void regions originating from irregularities in the outer boundary of the 2D point cloud. In yet another aspect, a labeling process (e.g., a connected component algorithm) can be performed with respect to the density image to determine a particular group of void pixels (e.g., a largest group of void pixels) near a center of the density image that corresponds to the void region for the object. Edges of the particular group of void pixels can be labeled as edges of the void region that corresponds to the object. As such, the edges of the void region can inform a shape and/or a size of the void region that corresponds to the object.

In an alternate embodiment, a Delaunay Triangulation algorithm can be applied directly to the 2D point cloud representation of the 2D plane to detect and/or segment a void region from the 2D point cloud representation. As a result of the Delaunay Triangulation algorithm being applied to the 2D point cloud representation, a collection of triangles that connect the 2D points of the 2D point cloud representation can be determined. Triangles from the collection of triangles that correspond to a certain size (e.g., triangles with a size that exceed a defined threshold such as triangles with an area greater than a $99^{th}$ percentile of triangle areas) can be selected. The selected triangles can, for example, describe parts of void regions in the 2D plane which comprise a gap with a certain size (e.g., a large gap) between 2D points. Additionally, certain adjacent triangles from the triangles can be merged into groups to describe void regions in the 2D plane. A particular void region (e.g., a largest void region) near a center of the 2D plane can be selected, where the particular void region corresponds to the void region for the object. Furthermore, a boundary of the particular void region (e.g., a boundary of a group of connected triangles that corresponds to the particular void region) can be computed and/or labeled as the boundary of the void region for the object.

Dimensions of the object can be inferred from a shape and/or a size of the void region for the object. In an embodiment, one or more line-fitting algorithms can be employed to estimate dimensions of the object from a shape and/or a size of the void region for the object. For example, one or more line-fitting algorithms can be employed to identify one or more line segments along a boundary of the void region for the object. One or more geometry equations can also be employed to infer lengths of corresponding edges of a box region associated with the void edges. In another embodiment, one or more iterative optimization algorithms can be employed to estimate dimensions of the object from a shape and/or a size of the void region for the object. For example, one or more iterative optimization algorithms can be employed to determine an optimal shape (e.g., an optimal box shape) which most accurately describes a shape of the void region for the object. In an aspect, multiple initial guesses (e.g., multiple estimates, multiple hypotheses, multiple predictions, multiple candidate shapes, etc.) for a shape and/or an orientation of the object can be determined. The multiple initial guesses can be formed by a combination of heuristics guesses and/or random guesses. The heuristics guesses can approximate a relation between dimensions of the object and the dimensions of the void region for the object. For instance, an example of a heuristics guess is guessing that lengths of the object and widths of the object are proportional to a square root of an area of the void region for the object. The random guesses can create random hypotheses of orientations of the object and/or sizes of the object, with values constrained to lie within bounded ranges that are derived from the heuristic guesses.

In another aspect, a shape and/or a size of the different guesses can be encoded using parameterization. For example, a location of a center of the object (e.g., X and Y coordinates), a length and/or a width of the object, an angle of the object, and/or a height of the object can be encoded. Furthermore, from each of the initial guesses of a size of the object, an optimization-based fitting procedure can be performed. Given a hypothesis for the shape and orientation of the object, an expected void region that the box creates in the 2D plane can be computed. In certain embodiments, rays from an illumination source through corners of a hypothetical object to the 2D plane can be mathematically projected. A first convex hull of points in the 2D plane can also be computed. Additionally or alternatively, rays from a camera through the corners of the hypothetical object can be mathematically projected to the 2D plane and a second convex hull of the points in the 2D plane can be computed. Additionally, a union of the first convex hull and the second convex hull can be computed. A result of the union of the first convex hull and the second convex hull can be, for example, the expected void region created by the hypothesis of the object shape. In yet another aspect, a similarity between the detected void region and the expected void region generated by the hypothesis of the object shape can be measured. In an example, the similarity between the detected void region and the expected void region generated by the hypothesis of the object shape can be measured using an Intersection over Union (IoU) technique.

In certain embodiments, a derivative-free optimization algorithm can be employed to iteratively refine the estimated shape of the object. For example, for each step of the derivative-free optimization algorithm, one or more steps of the optimization-based fitting procedure can be repeated for measuring similarly between the detected void region and the hypothetical void region. Furthermore, since the size and the orientation of the object can be parameterized by six variables (e.g., X and Y coordinate location of the center of the object, a length of the object, a width of the object, a height of the object, and/or an angle of the object), the optimization algorithm can alter estimated values of the six variables. In an implementation, the optimization algorithm can adjust one or more of the six variables until the Intersection over Union measurement of the similarity of the detected void region and the expected void region is maximized. In certain implementations, the optimization algorithm can be executed for a finite number of steps. In an alternate implementation, the optimization algorithm can terminate when the Intersection over Union stops increasing. Since the optimization procedure can be performed numerous times (e.g., starting from different initial guesses), the optimization procedure can be a multi-start optimization algorithm. When all optimization computations have finished, the computation resulting in a maximum Intersection over Union score can be labeled as a best fit (e.g., an optimal fit) for the object. Furthermore, dimensions of the object from that best fit can be provided as final inferred dimensions of the object. In certain embodiments, detected points in a 3D point cloud which lie on top of the object (e.g., and hence lie over the detected void region) can be additionally or alternatively employed to measure height of the object. Furthermore, for the optimization-based fitting procedure, an estimate of the height of the object can be modified to equal to the measured height of the object (e.g., to prevent the optimization algorithm from changing the value of the estimated height of the object). As such, data manipulation (e.g., manipulation of depth data and/or 3D points in a point cloud related to an object) can be performed to provide a predictive analytics tool for determining dimensions of an object.

FIG. 1 illustrates a system 100 that provides an exemplary environment within which one or more described features of one or more embodiments of the disclosure can be implemented. According to an embodiment, the system 100 can include a dimensioning system 102 to facilitate a practical application of computing dimensions of an object. The dimensioning system 102 can also be related to one or more technologies for computing dimensions of an object. The dimensioning system 102 can also employ hardware and/or software to solve one or more technical issues. Furthermore, the dimensioning system 102 provides technical functionality that is not abstract and cannot be performed as a mental process by a human. Moreover, the dimensioning system 102 can provide an improvement to one or more technologies such as dimensioning technologies, depth-sensing technologies (e.g., 3D depth-sensing technologies), scanning technologies, digital technologies and/or other technologies. In an implementation, the dimensioning system 102 can improve performance of a dimensioning device (e.g., a dimensioner). For example, the dimensioning system 102 can improve accuracy of computing dimensions of an object and/or can reduce an amount of time for computing dimensions of an object, as compared to conventional dimensioning devices (e.g., conventional dimensioners, a tape measure, etc.) related to dimensioning technologies. The dimensioning system 102 can include a point cloud component 104, a segmentation component 106 and/or an estimation component 108. Additionally, in certain embodiments, the dimensioning system 102 can include a processor 110 and/or a memory 112. In certain embodiments, one or more aspects of the dimensioning system 102 (and/or other systems, apparatuses and/or processes disclosed herein) can constitute executable instructions embodied within a computer-readable storage medium (e.g., the memory 112). For instance, in an embodiment, the memory 112 can store computer executable component and/or executable instructions (e.g., program instructions). Furthermore, the processor 110 can facilitate execution of the computer executable components and/or the executable instructions (e.g., the program instructions). In an example embodiment, the processor 110 can be configured to execute instructions stored in the memory 112 or otherwise accessible to the processor 110.

The processor 110 can be a hardware entity (e.g., physically embodied in circuitry) capable of performing operations according to one or more embodiments of the disclosure. Alternatively, in an embodiment where the processor 110 is embodied as an executor of software instructions, the software instructions can configure the processor 110 to perform one or more algorithms and/or operations described herein in response to the software instructions being executed. In an embodiment, the processor 110 can be a single core processor, a multi-core processor, multiple processors internal to the dimensioning system 102, a remote processor (e.g., a processor implemented on a server), and/or a virtual machine. In certain embodiments, the processor 110 be in communication with the memory 112, the point cloud component 104, the segmentation component 106 and/or the estimation component 108 via a bus to, for example, facilitate transmission of data among the processor 110, the memory 112, the point cloud component 104, the segmentation component 106 and/or the estimation component 108. The processor 110 can be embodied in a number of different ways and can, in certain embodiments, include one or more processing devices configured to perform independently. Additionally or alternatively, the processor 110 can include one or more processors configured in tandem via a bus to enable independent execution of instructions, pipelining of data, and/or multi-thread execution of instructions. The memory 112 can be non-transitory and can include, for example, one or more volatile memories and/or one or more non-volatile memories. In other words, for example, the memory 112 can be an electronic storage device (e.g., a computer-readable storage medium). The memory 118 can be configured to store information, data, content, one or more applications, one or more instructions, or the like, to enable the dimensioning system 102 to carry out various functions in accordance with one or more embodiments disclosed herein. As used herein in this disclosure, the term "component," "system," and the like, can be and/or can include a computer-related entity. For instance, "a component," "a system," and the like disclosed herein can be either hardware, software, or a combination of hardware and software. As an example, a component can be, but is not limited to, a process executed on a processor, a processor, circuitry, an executable component, a thread of instructions, a program, and/or a computer entity.

The dimensioning system 102 (e.g., the point cloud component 104 of the dimensioning system 102) can receive point cloud data 114. The point cloud data 114 can be related to a scene associated with an object. The object can be a physical item, an element, a device, or the like that is present in the scene. For example, the object can be a package, a parcel, a box, a case, a carton, a pallet and/or another object in a material handling environment (e.g., a distribution center, a shipping center, a warehouse, a factory, etc.). In certain embodiments, the object can be a dynamic object with a location that is not fixed. For example, the object can be shipped-in, shipped-out, or otherwise moved in an environment. Alternatively, the object can be a fixed object with a fixed location within an environment. The object can also comprise a certain color. In an implementation, the object can comprise a dark color such that active illumination (e.g., from structured light, from a time of flight camera, etc.) is mostly absorbed by the object. In an aspect, the point cloud data 114 can be representative of a 3D point cloud for the scene associated with the object. The point cloud data 114 can include a plurality of 3D points that represent 3D coordinates of various points in the scene. For instance, the plurality of 3D points of the point cloud data 114 can lie over a surface of the object and/or one or more different surfaces captured in the scene. As such, the point cloud data 114 can include 3D points on at least one surface related to the object. The 3D coordinates can be, for example, coordinates in three-dimensions such as, but not limited to, an x-axis coordinate, a y-axis coordinate, and/or a z-axis coordinate of respective points in the scene. In another aspect, the point cloud data 114 can correspond to a geometric feature of the object to facilitate computing dimensions of the object. The geometric features of the object can include, but not limited to, corners of the object, edges of the object, portions of the object, interest points of the object, regions of interest points of the object, and/or another type of geometric feature of the object. Illustratively, in some embodiments, a geometric feature cab be a distinguishing feature on the object, such as, but not limited to, a corner of a cuboid/box shape object, etc. In certain embodiments, identification of the 3D points of the point cloud data 114 can involve using one or more interest point detection techniques, such as, but not limited to, corner detection, edge detection, feature detection, etc.

In an embodiment, the point cloud data 114 can be generated based on imaging data. For example, the imaging data can be processed to generate the point cloud data 114. The imaging data can be one or more images (e.g., one or more 2D images and/or one or more 3D images) related to the scene associated with an object. The scene associated with the object can be scanned by a dimensioning device (e.g., a dimensioner) to facilitate computing dimensions of the object. For example, a pattern projector device of the dimensioning device (e.g., the dimensioner) can project a pattern of light onto the scene associated with the object. Furthermore, an imaging device of the dimensioning device (e.g., the dimensioner) can capture one or more images associated with the scene to generate the imaging data. The imaging data can include, for example, a plurality of pixels in one or more image planes. For example, each pixel in the plurality of pixels can represent a point in the scene, where the scene can include one or more planes. The one or more image planes can be, for example, one or more 2D planes and/or one or more 3D planes. In an aspect, each pixel in the plurality of pixels can include color data, intensity data and/or depth data. The color data can be represented in the form of one or more color schemes such as, but not limited to, a RGB color scheme, a CMYK color scheme, a monochrome color scheme, a grayscale color scheme, and/or the another type of color scheme. The intensity data can be representative of a brightness associated with each pixel. The depth data can correspond to a distance of a respective point, represented by a respective pixel, from the imaging device that captures the one or more images. In an example embodiment, the one or more images of the imaging data can be encoded and/or represented in one or more formats such as JPEG, Bitmap, PNG, RAW, and/or another type of format.

The point cloud component 104 can convert the point cloud data 114 into a density image for the scene associated with the object. The density image can be a 2D image that provides a density of 2D points across a plane associated with the scene. In an aspect, to facilitate generation of the density image, the point cloud component 104 can transform the point cloud data 114 into a coordinate system where a 2D plane associated with the object is located in an X-Y plane and a positive Z axis can correspond to a vertical direction above the 2D plane. The 2D plane can be a ground plane that describes a surface upon which the object is placed. As such, the point cloud component 104 can transform the point cloud data 114 into a 2D point cloud representation. In certain embodiments, the point cloud component 104 can select 3D points of the point cloud data 114 that are located within a threshold distance of the 2D plane. For example, the point cloud component 104 can select 3D points with a Z coordinate that corresponds to a range −T<Z<T, where T represents the threshold distance. Resulting 3D points of the point cloud data 114 can constitute 3D points from the 2D plane.

The 2D point cloud representation can facilitate segmenting a void region from the 2D point cloud representation that corresponds to the object. The point cloud component 104 can, for example, convert 2D points of the 2D point cloud representation into the density image. The density image can be a 2D image that provides a density of 2D points across the 2D plane. Furthermore, the density image can be represented by black pixels and white pixels. The white pixels of the density image can correspond to one or more void regions of the density image. The black pixels of the density image can correspond to one or more non-void regions of the density image. In an aspect, the point cloud component 104 can divide the 2D point cloud representation into a grid of data bins to facilitate generation of the density image. In an example, the data bins can be configured as square data bins such that the grid of data bins can be a regularly-shaped grid of square data bins. The point cloud component 104 can also determine a number of 2D points located within respective data bins. The point cloud component 104 can employ the number of 2D points located within respective data bins to determine values of respective pixels of the density image.

In certain embodiments, the point cloud component 104 can employ adaptive bins sizes for the data bins to facilitate generation of the density image. For example, the point cloud component 104 can convert the point cloud data 114 into the density image based on at least a first data bin associated with a first size and a second data bin associated with a second size. The second size of the second data bin can be different than the first size of the first data bin. The point cloud component 104 can also adjust sizes of the data bins as 2D point density in the 2D point cloud representation changes to a number of 2D points per data bin stays approximately constant, therefore reducing a number of void regions of the density image. For example, the point cloud component 104 can modify a size of a data bin for the density image as a function of data point density associated with the point cloud data 114 (e.g., a density of the 2D point cloud representation of the point cloud data 114) to generate a modified data bin for the density image. The point cloud component 104 can also convert the point cloud data 114 into the density image based on the modified data bin. The point cloud component 104 can also compute an optimal bin width, in an embodiment. For instance, in an embodiment, the point cloud component 104 can compute an optimal bin width w based on the following equation:

$$\frac{w(z)}{w(z_{start})} = \frac{\left(1 + \frac{z}{H}\tan(\alpha)\right)^{\frac{3}{2}}}{\left(1 + \frac{z_{start}}{H}\tan(\alpha)\right)^{\frac{3}{2}}}$$

where H is a height of the pattern projector device above the 2D plane (e.g., the ground plane), $z_{start}$ is a distance from a base of the pattern projector device to a starting point in the 2D point cloud representation along the 2D plane (e.g., the ground plane), z is a distance from the base of the pattern projector device to another point in the 2D point cloud representation along the 2D plane (e.g., the ground plane), and a is an angle related to a tilt of the imaging device that captures the one or more images associated with the scene.

In certain embodiments, the point cloud component 104 can modify the point cloud data 114 such that the 2D point cloud representation includes data along a single data plane (e.g., along the 2D plane). For instance, the point cloud component 104 can select a subset of the point cloud data 114 associated with a first plane that is different than a second plane related to a bottom surface of the object. In an example, the second plane can be the 2D plane (e.g., the ground plane) upon which the bottom surface of the object is placed during capture of the point cloud data 114 associated with the scene. The first plane can be a plane that is parallel to and below the second plane. Furthermore, the point cloud component 104 can project the subset of the point cloud data 114 into the second plane to generate modified point cloud data associated with the scene that contains the object. For example, the point cloud component 104 can remove a Z coordinate of the subset of the point cloud data 114 while retaining only an X coordinate and a Y coordinate for the subset of the point cloud data 114 to form the 2D point cloud representation of the 3D points associated with the point cloud data 114. The point cloud component 104 can also convert the modified point cloud data into the density image.

The segmentation component 106 can segment the density image to determine a void region in the density image that corresponds to the object. For instance, the segmentation component 106 can employ one or more segmentation techniques to identify a void region in the density image that corresponds to the object. In an aspect, the segmentation component 106 can employ one or more segmentation techniques to identify a set of white pixels in the density image that form the void region that corresponds to the object. Furthermore, the estimation component 108 can generate dimension data 116 for the object based on the void region (e.g., the segmented void region) for the density image. The dimension data 116 can be indicative of one or more dimensions of the object. For example, the dimension data 116 can include length data for the object, width data for the object, height data for the object, angle data for the object, position data of the object, and/or other dimension data for the object. In an embodiment, the segmentation component 106 can reduce a size and/or prevalence of one or more void regions in the density image that are not related to the object to facilitate identifying the void region in the density image that corresponds to the object.

The segmentation component 106 can, for example, modify the void region in certain embodiments to generate a modified void region for the density image. Furthermore, the estimation component 108 can determine the dimension data 116 for the object based on the modified void region for the density image. In an example, the void region that corresponds to the object can be a first void region in the density image. Furthermore, the segmentation component 106 can remove at least a second void region from the density image (e.g., a second void region that does not correspond to the object) based on a region of interest that is centered with respect to a center point of the density image. In certain embodiments, the segmentation component 106 can additionally or alternatively dynamically set a resolution of respective portions of the density image to segment the density image. In another embodiment, the segmentation component 106 can apply one or more morphological operations to the density image to, for example, modify an appearance of one or more portions of the density image. For example, the segmentation component 106 can smooth one or more portions of the density image, reduce a number of irregularities associated with one or more portions of the density image, etc. The segmentation component 106 can additionally or alternatively apply the one or more morphological operations to the density image to fill in certain void regions that correspond to a certain size (e.g., to fill in small void regions). In certain embodiments, the segmentation component 106 can remove one or more void regions of the density image from an outer boundary of the density image. Furthermore, the segmentation component 106 can additionally remove one or more void regions inward from the outside region of the density image to remove void regions originating from irregularities in the outer boundary of the 2D point cloud representation. The segmentation component 106 can also perform a labeling process (e.g., a connected component algorithm), in certain embodiments, with respect to the density image to determine a particular group of void pixels (e.g., a largest group of void pixels) near a center of the density image that corresponds to the void region for the object. Edges of the particular group of void pixels can be labeled (e.g., by the segmentation component 106) as edges of the void region that corresponds to the object. As such, the segmentation component 106 can employ the edges of the void region to determine dimensions of the void region that corresponds to the object.

In an alternate embodiment, the segmentation component 106 can perform a Delaunay Triangulation algorithm with respect to the 2D point cloud representation of the 2D plane to detect and/or segment the void region from the 2D point cloud representation. As a result of the Delaunay Triangulation algorithm being applied to the 2D point cloud representation, the segmentation component 106 can determine a collection of triangles that connect the 2D points of the 2D point cloud representation. In an example implementation, the segmentation component 106 can select triangles from the collection of triangles that correspond to a certain size (e.g., triangles with a size that exceed a defined threshold such as triangles with an area greater than a $99^{th}$ percentile of triangle areas). The selected triangles can, for example, describe parts of void regions in the 2D plane which comprise a gap with a certain size (e.g., a large gap) between 2D points. Additionally, the segmentation component 106 can merge certain adjacent triangles from the triangles into groups to describe void regions in the 2D plane. Moreover, the segmentation component 106 can select a particular void region (e.g., a largest void region) near a center of the 2D plane. The particular void region can correspond to the void region for the object. Furthermore, the segmentation component 106 can label a boundary of the particular void region (e.g., a boundary of a group of connected triangles that corresponds to the particular void region) as the boundary of the void region for the object.

The estimation component 108 can perform optimization-based estimation, in certain embodiments, to determine the dimension data 116 for the object. In an aspect, the estimation component 108 can generate a predicted void region for the object. The predicted void region generated by the estimation component 108 can be different than the void region (e.g., the segmented void region) determined by the segmentation component 106. The predicted void region can be an initial estimate of the dimensions of the object. In an aspect, the estimation component 108 can determine an initial estimate for one or more variables of the object such as, for example, a predicted length of the object, a predicted width of the object, a predicted height of the object, a predicted angle of the object and/or a predicted position of center of the object. The estimation component 108 can compute the predicted void region for the object based on the predicted length of the object, the predicted width of the object, the predicted height of the object, the predicted angle of the object and/or the predicted position of center of the object. Furthermore, the estimation component 108 can employ one or more optimization algorithms to refine the predicted void region for the object based on the predicted length of the object, the predicted width of the object, the predicted height of the object, the predicted angle of the object and/or the predicted position of center of the object.

The estimation component 108 can also employ the one or more optimization algorithms to maximize an agreement between dimensions of the predicted void region and the void region (e.g., the segmented void region) determined by the segmentation component 106. In certain embodiments, the estimation component 108 can maximize an Intersection of Union between the predicted void region and the void region (e.g., the segmented void region) determined by the segmentation component 106. In one example, the estimation component 108 can employ a Nelder-Mead optimization algorithm to maximize an agreement between dimensions of the predicted void region and the void region (e.g., the segmented void region) determined by the segmentation component 106. The Nelder-Mead optimization algorithm can, for example, determine a minimum or a maximum of an objective function for the Intersection of Union represented by the 2D point cloud representation of the 3D points associated with the point cloud data 114. In another example, the estimation component 108 can employ a multi-start optimization algorithm to maximize an agreement between dimensions of the predicted void region and the void region (e.g., the segmented void region) determined by the segmentation component 106. The multi-start optimization algorithm can, for example, employ multiple paths to determine a minimum or a maximum of an objective function for the Intersection of Union represented by the 2D point cloud representation of the 3D points associated with the point cloud data 114. In yet another example, the estimation component 108 can employ a Powell optimization algorithm, a Broyden-Fletcher-Goldfarb-Shanno (BFGS) optimization algorithm, and/or a sequential quadratic programming optimization algorithm to maximize an agreement between dimensions of the predicted void region and the void region (e.g., the segmented void region) determined by the segmentation component 106. However, it is to be appreciated that, in certain embodiments, the estimation component 108 can employ a different type of optimization algorithm to maximize an agreement between dimensions of the predicted void region and the void region (e.g., the segmented void region) determined by the segmentation component 106. As such, the estimation component 108 can modify estimated dimensions of the predicted void region based on one or more optimization techniques to generate an optimized version of the estimated dimensions for the object (e.g., an optimized version of the predicted void region). Furthermore, the estimation component 108 can modify the predicted void region for the object based on a comparison between the void region and the predicted void region.

Figure 2:
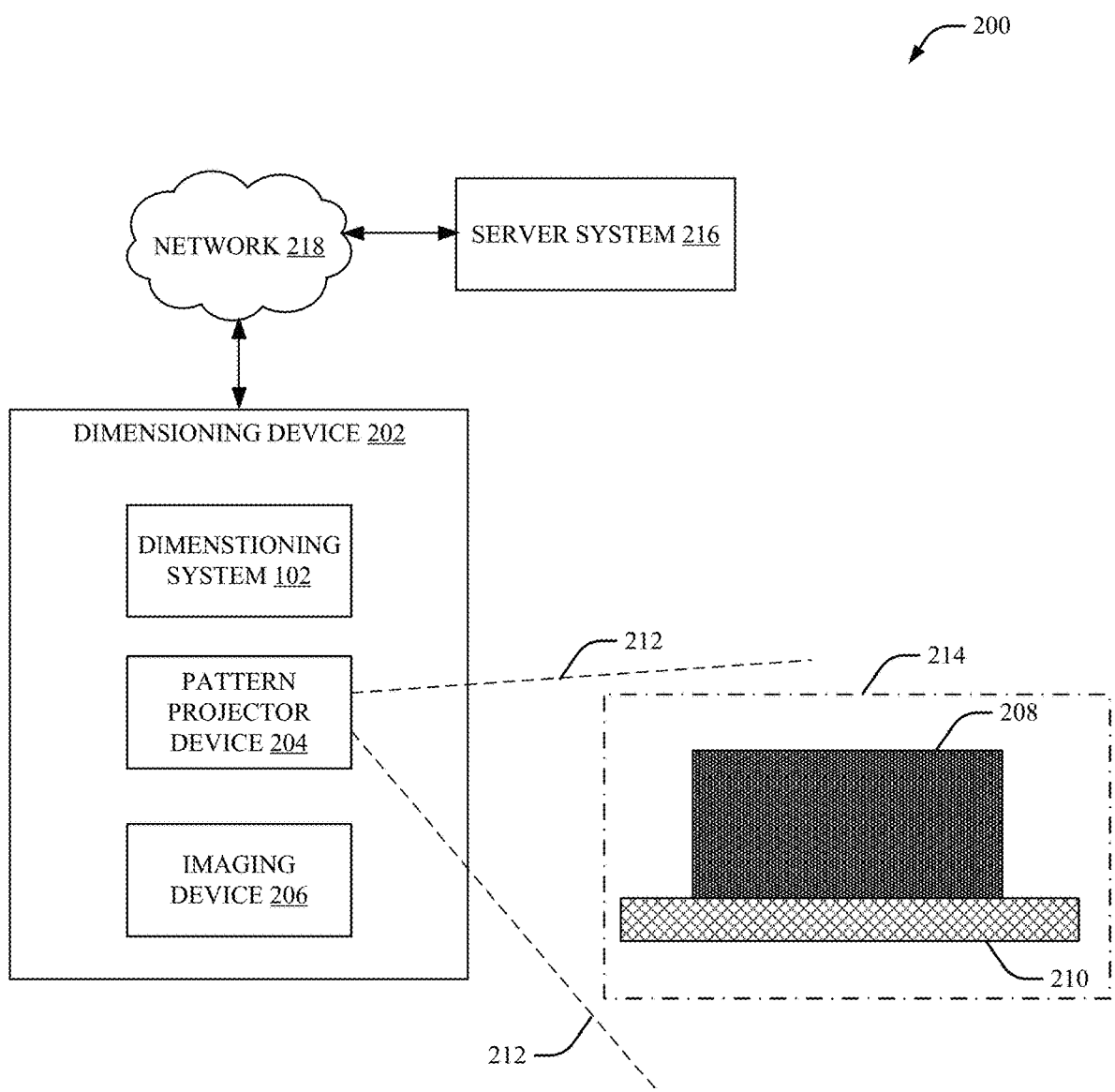
FIG. 2 illustrates a system that includes a dimensioning device, in accordance with one or more embodiments described herein.

FIG. 2 illustrates a system 200 that provides an exemplary environment within which one or more of the described features of one or more embodiments of the disclosure can be implemented. Repetitive description of like elements described in other embodiments herein is omitted for sake of brevity. The system 200 includes a dimensioning device 202 that determines (e.g., computes) dimensions of an object 208. The dimensioning device 202 can be, for example, a dimensioner associated with dimensioning technology and/or depth-sensing technology. The dimensioning device 202 can include the dimensioning system 102, a pattern projector device 204 and/or an imaging device 206. The dimensioning system 102 can include the point cloud component 104, the segmentation component 106, the estimation component 108, the processor 110 and/or the memory 112. The pattern projector device 204 can be an illumination source for providing illumination in a field of view of the dimensioning device 202. For example, the pattern projector device 204 can project a pattern of light 212 onto a scene 214 associated with the object 208. The pattern projector device 204 can employ a light source (e.g., a laser, a light emitting diode, etc.) to project the pattern of light 212. In an example, the pattern of light 212 can be infrared light that comprises points of light arranged in a pattern (e.g., a point cloud pattern).

The object 208 can be a physical item, an element, a device, or the like that is present in the scene 214. For example, the object 208 can be a package, a parcel, a box, a case, a carton, a pallet and/or another object. In certain embodiments, the object 208 can be a dynamic object with a location that is not fixed. For example, the object 208 can be shipped-in, shipped-out, or otherwise moved in an environment. Alternatively, the object 208 can be a fixed object with a fixed location within an environment. The object 208 can also comprise a certain color. In an implementation, the object 208 can comprise a dark color such that illumination by the pattern of light 212 is mostly absorbed by the object 208. In certain embodiments, the scene 214 can be associated with a material handling environment (e.g., a distribution center, a shipping center, a warehouse, a factory, etc.). Additionally, in certain embodiments, the object 208 can be placed on a platform 210. The platform 210 can be, for example, a weight scale or another type of platform that alters a ground plane associated with the object 208.

The imaging device 206 can capture one or more images associated with the scene 214 to generate imaging data related to the scene 214. The imaging device 206 can be one or more image capturing devices such as one or more cameras (e.g., one or more camera units). For example, the imaging device 206 can include an image sensor (e.g., a CMOS sensor, a CCD sensor, etc.) to facilitate generation of one or more images related to the pattern of light 212 and the scene 214. In certain embodiments, the imaging device 206 can include an embedded processor (e.g., an embedded processor that is different than the processor 110 of the dimensioning system 102) configured to control the pattern projector device 204 and/or the imaging device 206. In an embodiment, the imaging device 206 (e.g., the embedded processor of the imaging device 206) can process the imaging data to generate the point cloud data 114. Furthermore, the imaging device 206 (e.g., the embedded processor of the imaging device 206) can provide the point cloud data 114 to the dimensioning system 102 (e.g., the point cloud component 104 of the dimensioning system 102).

In an alternate embodiment, the dimensioning device 202 (e.g., communications circuitry of the dimensioning device 202) can transmit the imaging data (e.g., the imaging data generated by the imaging device 206) to a server system 216 via a network 218. The server system 216 can include a processor (e.g., a processor that is different than the processor 110 of the dimensioning system 102) that can process the imaging data to generate the point cloud data 114. Furthermore, the dimensioning system 102 (e.g., the point cloud component 104 of the dimensioning system 102) can receive the point cloud data 114 from the server system 216 (e.g., via the network 218), in an alternate embodiment. The network 218 can be a communications network that employs wireless technologies and/or wired technologies to transmit data between the dimensioning device 202 and the server system 216. For example, the network 218 can be a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network.

Figure 3:
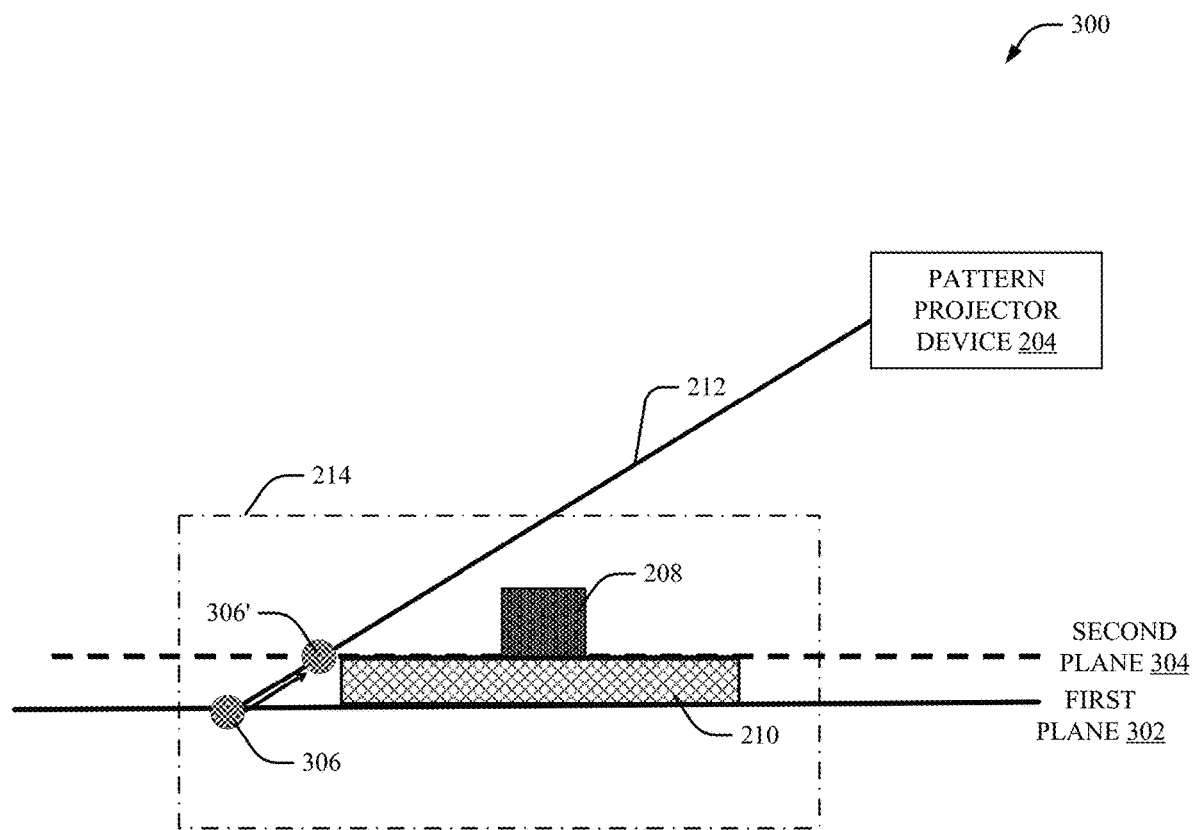
FIG. 3 illustrates a system associated with an exemplary environment for an object, in accordance with one or more embodiments described herein.

FIG. 3 illustrates a system 300 that provides an exemplary environment within which one or more of the described features of one or more embodiments of the disclosure can be implemented. Repetitive description of like elements described in other embodiments herein is omitted for sake of brevity. The system 300 includes the pattern projector device 204 (e.g., the pattern projector device 204 of the dimensioning device 202) that projects the pattern of light 212 onto the scene 214 that includes the object 208 and/or the platform 210. In an embodiment, a bottom surface of the platform 210 can be placed on a first plane 302. Furthermore, a bottom surface of the object 208 can be placed on a second plane 304. The first plane 302 can be a first 2D plane in an X-Y coordinate direction and the second plane 304 can be a second 3D plane in the X-Y coordinate direction. Additionally, the first plane 302 can be parallel to the second plane 304. The second plane 304 can be, for example, a ground plane for the object 208. Furthermore, the second plane 304 can be located above the first plane 302. For instance, the second plane 304 can be located a certain distance in a vertical Z coordinate direction with respect to the first plane 302. In an embodiment, the dimensioning system 102 (e.g., the point cloud component 104 of the dimensioning system 102) can select a point 306 below the second plane 304 and can project the point 306 into the second plane 304 to provide a modified point 306'. As such, an elevation of the point 306 can be corrected. The point 306 can be, for example, a 2D point in a 2D point cloud representation associated with the point cloud data 114. In an aspect, the dimensioning system 102 (e.g., the point cloud component 104 of the dimensioning system 102) can project the point 306 along a ray to a center of the pattern projector device 204 to provide the point 306'.

Figure 4:
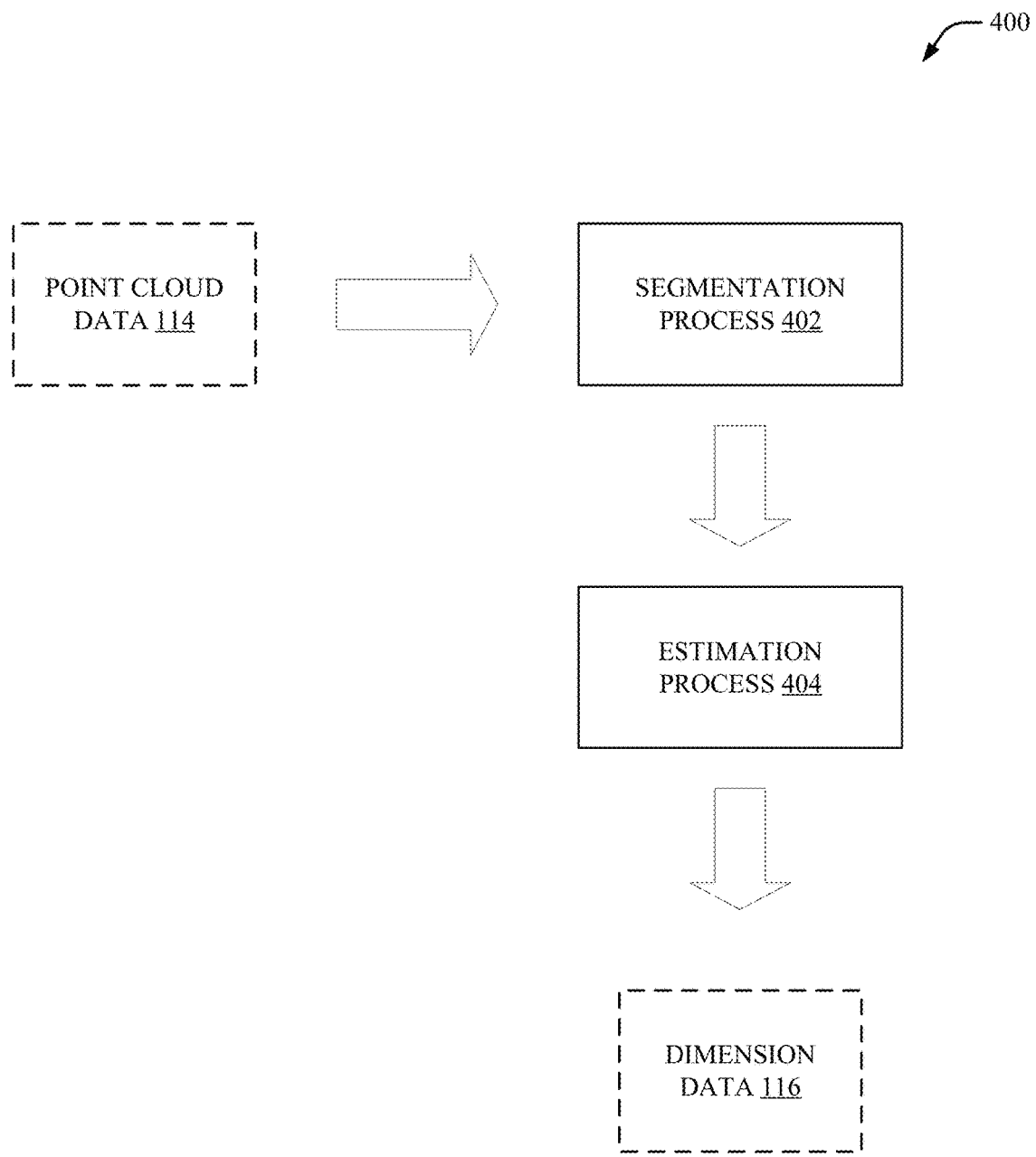
FIG. 4 illustrates a system associated with a segmentation process and an estimation process, in accordance with one or more embodiments described herein.

FIG. 4 illustrates a system 400 in accordance with one or more embodiments of the disclosure. Repetitive description of like elements described in other embodiments herein is omitted for sake of brevity. The system 400 includes segmentation process 402 and an estimation process 404. The segmentation process 402 can be performed by the point cloud component 104 and/or the segmentation component 106, for example. The estimation process 404 can be performed, for example, by the estimation component 108. In an embodiment, the segmentation process 402 can receive the point cloud data 114. The segmentation process 402 can also convert the point cloud data 114 into a density image. Furthermore, the segmentation process 402 can segment a void region created by an object (e.g., the object 208). The estimation process 404 can estimate dimensions of the object (e.g., the object 208) from the void region determined by the segmentation process 402. Furthermore, the estimation process 404 can generate the dimension data 116 that includes the dimensions for the object (e.g., the object 208) associated with the void region determined by the segmentation process 402.

Figure 5:
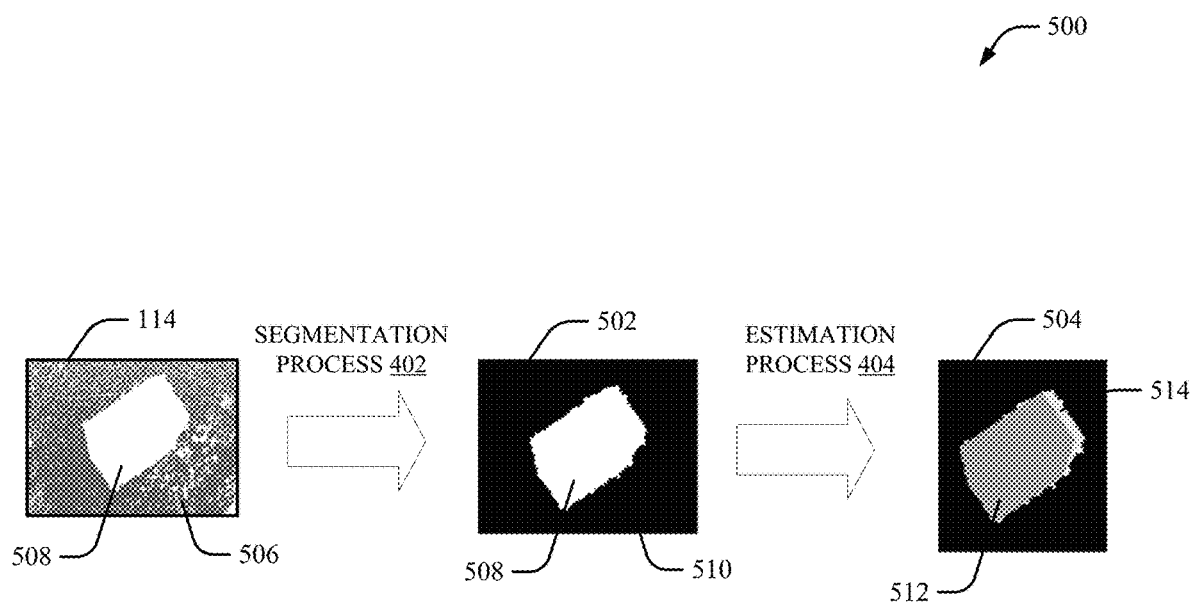
FIG. 5 illustrates another system associated with a segmentation process and an estimation process, in accordance with one or more embodiments described herein.

FIG. 5 illustrates a system 500 in accordance with one or more embodiments of the disclosure. Repetitive description of like elements described in other embodiments herein is omitted for sake of brevity. The system 500 includes the point cloud data 114, a density image 502 and an optimized image 504. The point cloud data 114 can include, for example a plurality of 3D points 506 that represent 3D coordinates of various points in a scene (e.g., the scene 214). The point cloud data 114 can also include a region 508 with no 3D points. The segmentation process 402 can be performed based on the point cloud data 114 to generate a density image 502. The density image 502 can be a 2D image that provides a density of 2D points across a 2D plane (e.g., the second plane 304). The 2D points can be calculated based on the point cloud data 114 (e.g., the plurality of 3D points 506 of the point cloud data 114). The density image 502 can include the region 508. The region 509 can be a void region that corresponds to an object (e.g., the object 208) included in a scene (e.g., the scene 214) associated with the point cloud data 114. The density image 502 can also include a non-void region 510 that is not related to the object (e.g., the object 208) included in the scene (e.g., the scene 214). The estimation process 404 can be performed (e.g., based on the region 508 of the density image 502) to provide the optimized image 504. The optimized image 504 can include a predicted void region 512. In certain embodiments, the predicted void region 512 can be different than a measured void region 514 that corresponds to the region 508 of the density image 502. For example, the estimation process 404 can employ one or more optimization algorithms to refine dimensions of the predicted void region 512 in order to maximize agreement of dimensions between the predicted void region 512 and the measured void region 514.

Figure 6:
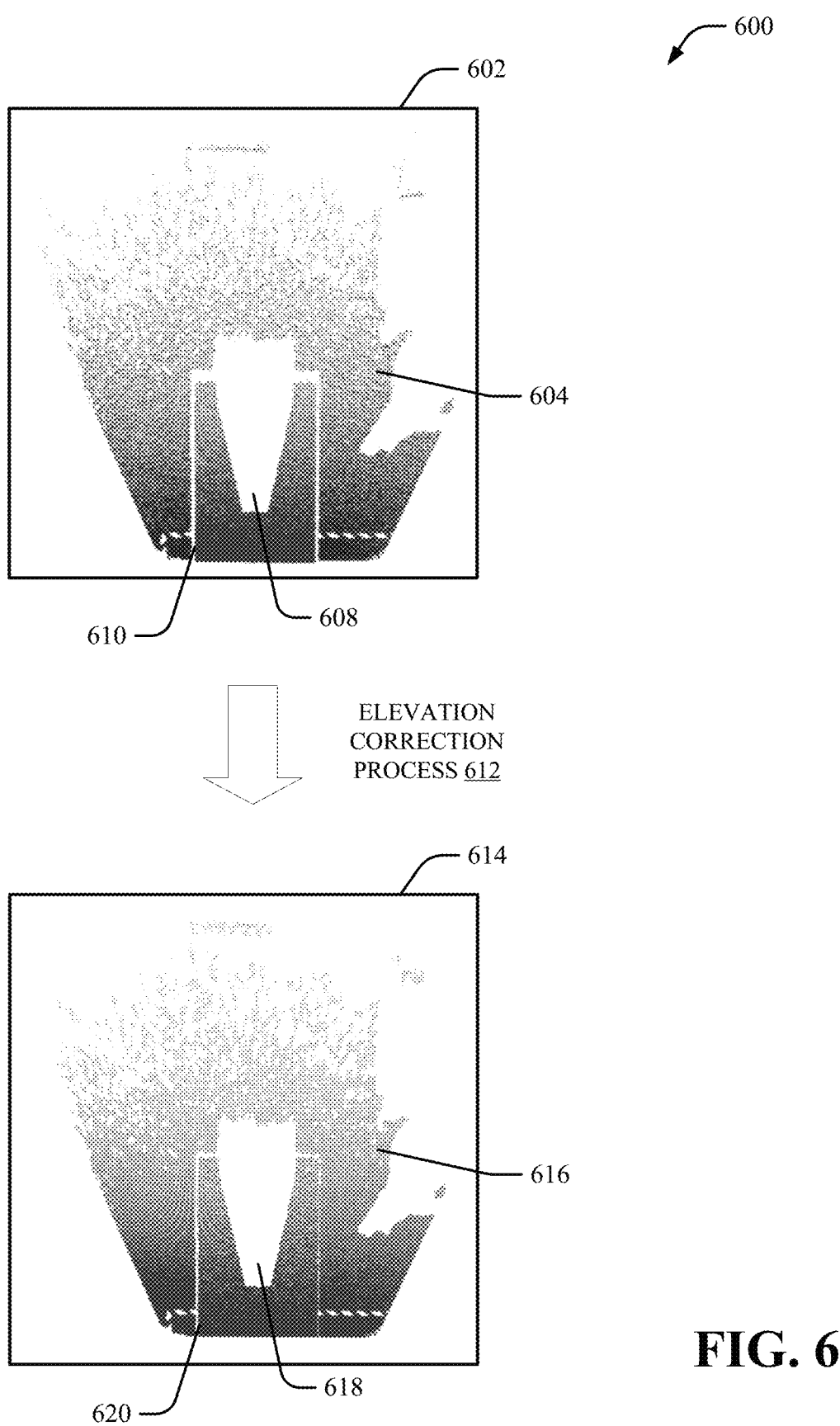
FIG. 6 illustrates a system associated with an elevation correction process, in accordance with one or more embodiments described herein.

FIG. 6 illustrates a system 600 in accordance with one or more embodiments of the disclosure. Repetitive description of like elements described in other embodiments herein is omitted for sake of brevity. The system 600 includes a 3D point cloud 602. The 3D point cloud 602 includes a plurality of 3D points 604. Furthermore, the 3D point cloud 602 includes one or more voids such as a void region 608 that corresponds to an object (e.g., the object 208) and a void region 610 that does not correspond to the object. An elevation correction process 612 can be performed (e.g., by the point cloud component 104) to alter elevation of at least a portion of the plurality of 3D points 604. For example, the elevation correction process 612 can be performed (e.g., by the point cloud component 104) to alter elevation of a portion of the plurality of 3D points 604, resulting in a 2D point cloud representation 614. In an aspect, Z coordinates of the plurality of 3D points 604 can be dropped (e.g., to retain only X and Y coordinates of the plurality of 3D points 604), which can result in a plurality of 2D points 616. The plurality of 2D points 616 can be located in a corresponding 2D plane (e.g., a ground plane, the second plane 304, etc.). Furthermore, as a result of the elevation correction process 612, the void region 608 can be modified to form a modified void region 618. Furthermore, the void region 610 can be modified (e.g., reduced) to form a modified void region 620. In an aspect, as a result of the elevation correction process 612, a portion of the plurality of 3D points 604 that lie below the 2D plane (e.g., the ground plane, the second plane 304, etc.) can be corrected. For instance, a portion of the plurality of 3D points 604 that lie in the first plane 302 can be elevated to the second plane 304. Moreover, as a result of the elevation correction process 612, edges of points in the 2D point cloud representation 614 can level. Voids that do not correspond to the object, such as the void region 610, can also become thinner and/or removed as a result of the elevation correction process 612.

Figure 7:
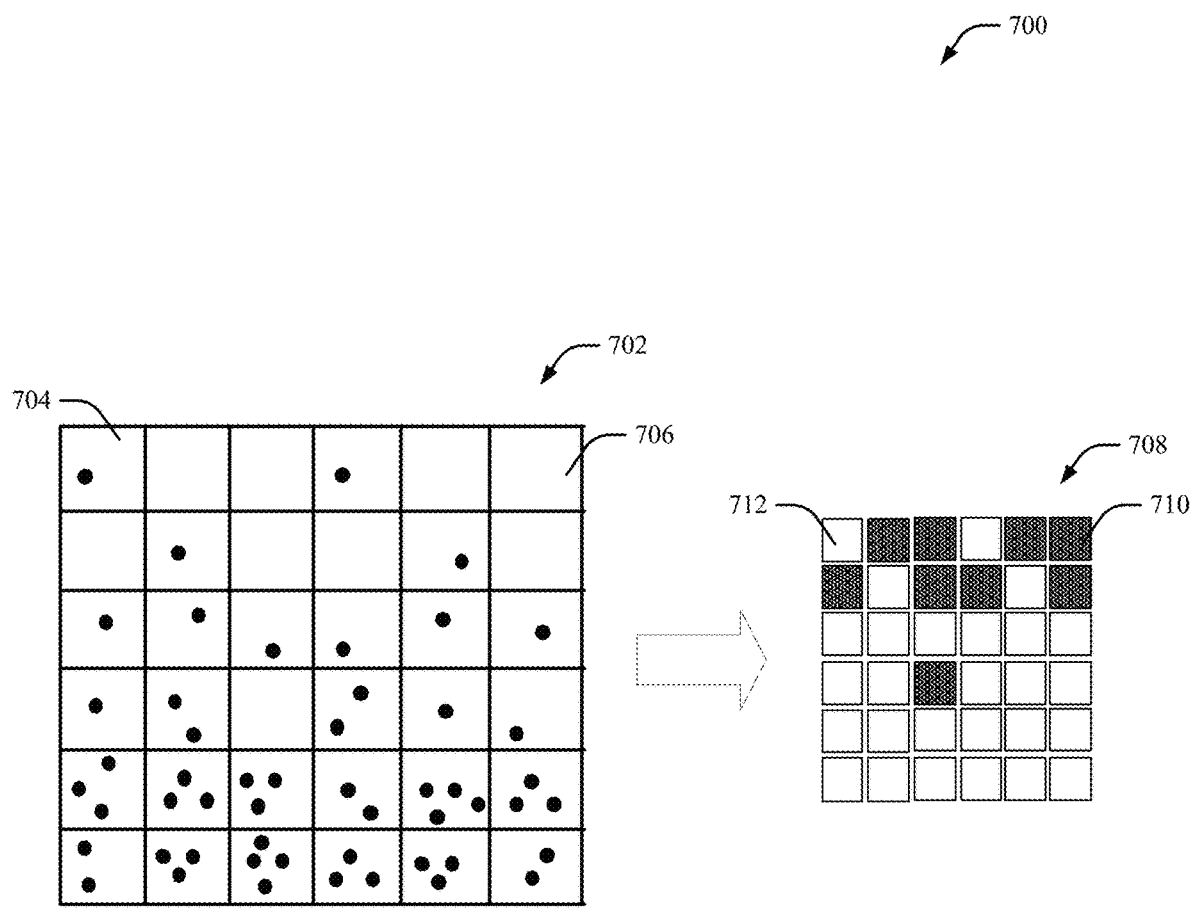
FIG. 7 illustrates a system associated with data bins, in accordance with one or more embodiments described herein.

FIG. 7 illustrates a system 700 in accordance with one or more embodiments of the disclosure. Repetitive description of like elements described in other embodiments herein is omitted for sake of brevity. The system 700 includes a set of data bins 702. The set of data bins 702 can include fixed-sized data bins. For example, a data bin 704 and a data bin 706 can comprise a corresponding size and/or a corresponding shape (e.g., a rectangular shape). In an implementation, the set of data bins 702 can be a rectangular grid of square bins. In an aspect, the point cloud component 104 can determine a number of points from the 3D point cloud that are contained in each bin. For example, the data bin 704 can include a single point and the data bin 706 can include no points. In another aspect, a density image 708 can be formed from a number of points per bin of the set of data bins 702. For example, a data bin with no points (e.g., the data bin 706) can become a void region (e.g., void region 710) in the density image 708. Furthermore, a data bin with one or more points (e.g., the data bin 704) can become a non-void region (e.g., non-void region 712) in the density image 708.

Figure 8:
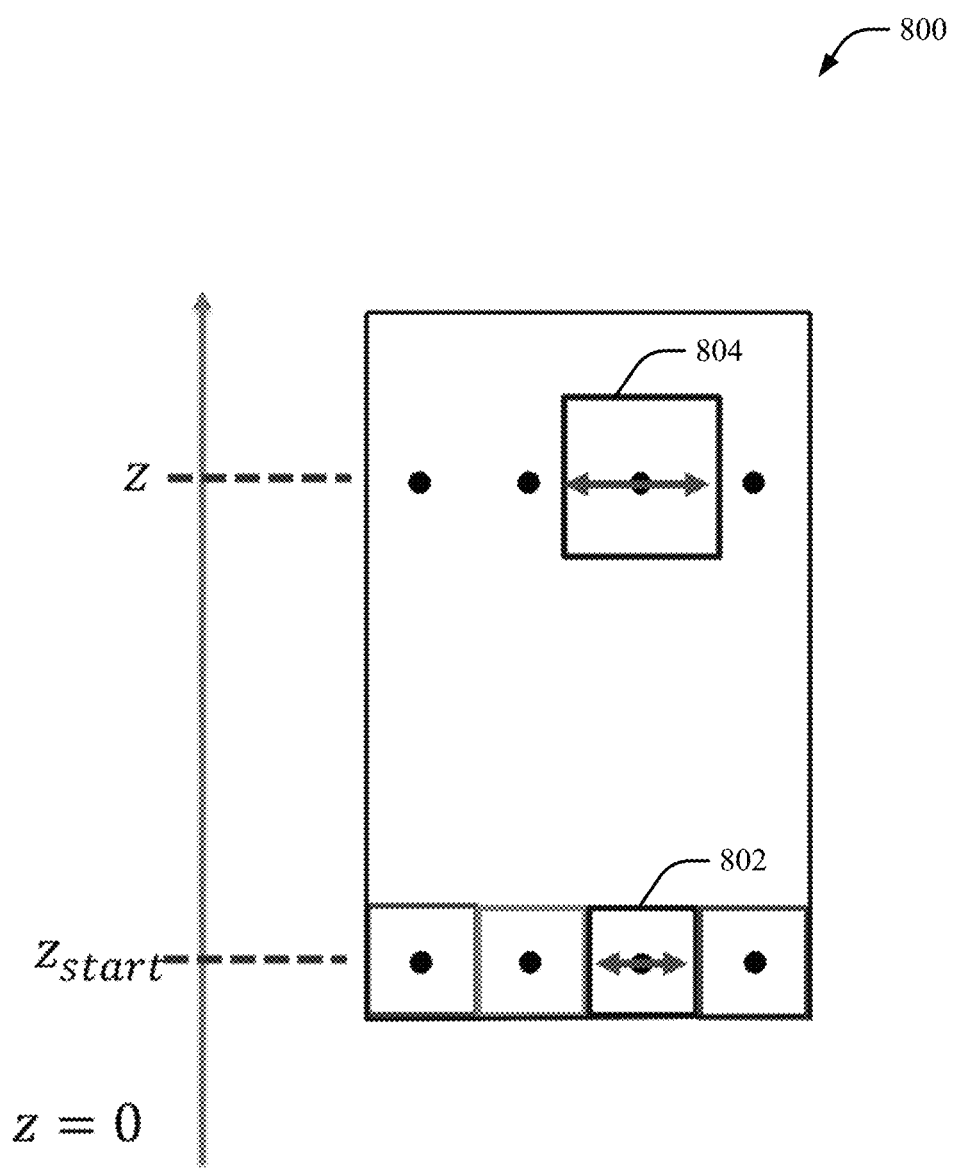
FIG. 8 illustrates another system associated with data bins, in accordance with one or more embodiments described herein.

FIG. 8 illustrates a system 800 in accordance with one or more embodiments of the disclosure. Repetitive description of like elements described in other embodiments herein is omitted for sake of brevity. The system 800 illustrates adaptive bin sizes to facilitate generating a density image. For example, the point cloud component 104 can adjust sizes of data bins as point density changes so that a number (e.g., a mean number) of points per data bin remains constant (e.g., to reduce the number of void regions in a density image). For example, a data bin width for a data bin 802 can correspond to $w(z_{start})$ at a distance $z_{start}$. Furthermore, a data bin width for a data bin 804 can be altered (e.g., increased or decreased) with respect to the data bin 802. A bin width for the data bin 804 can correspond to, for example, $w(z)$ at a distance z, where the distance $z_{start}$ and the distance z correspond to different point locations in a 3D point cloud.

Figure 9:
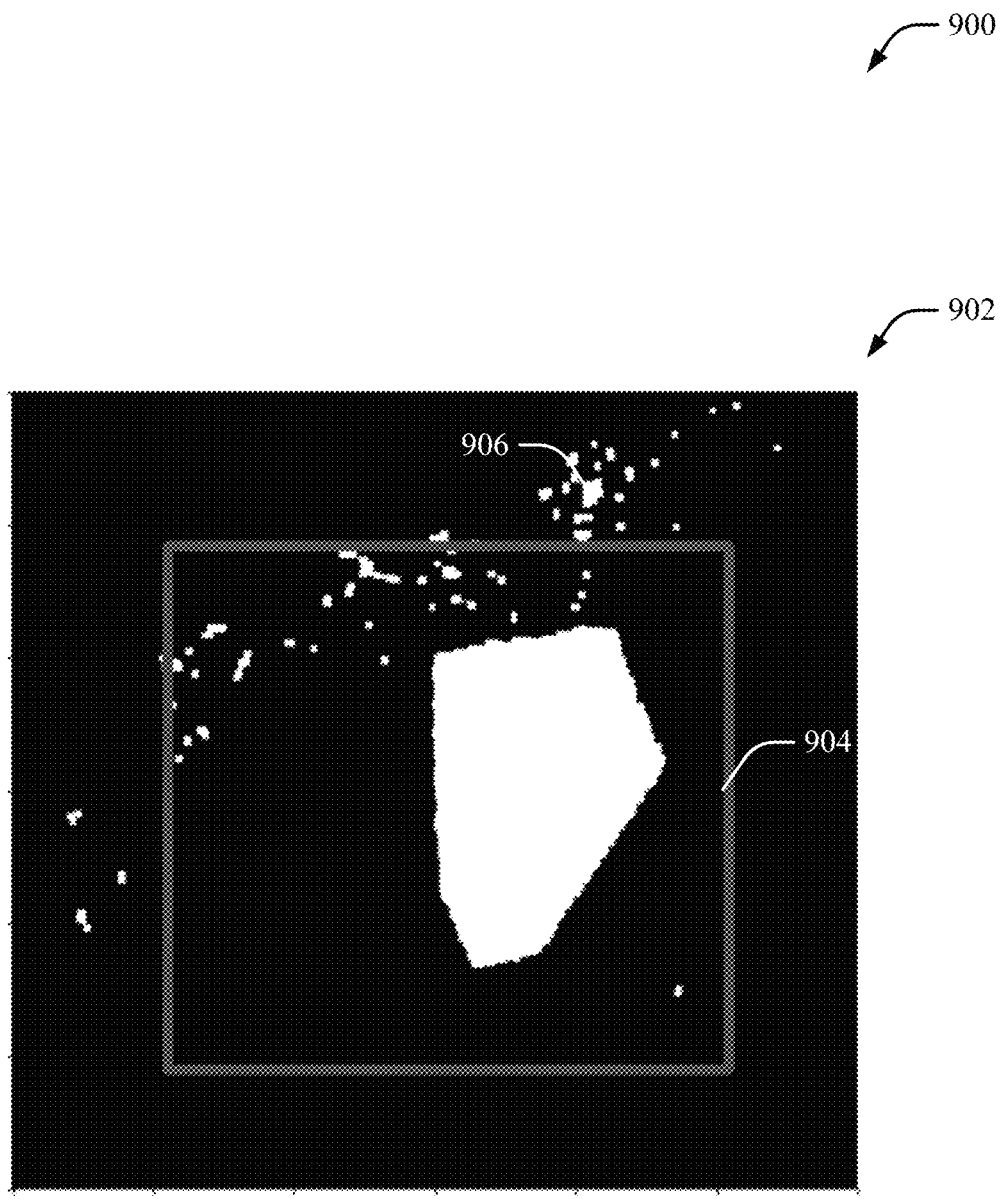
FIG. 9 illustrates a system associated with a region of interest for a density image, in accordance with one or more embodiments described herein.

FIG. 9 illustrates a system 900 in accordance with one or more embodiments of the disclosure. Repetitive description of like elements described in other embodiments herein is omitted for sake of brevity. The system 900 includes a density image 902. In the embodiment shown in FIG. 9, the segmentation component 106 can remove one or more void regions of the density image 902 that are outside of a region of interest 904. For example, the region of interest 904 can be centered with respect to a center point of the density image 902. Furthermore, the segmentation component 106 can remove (e.g., filter) one or more void regions (e.g., void region 906) from the density image 902. As such, void regions that do no overlap the region of interest 904 can be filtered out from the density image 902.

Figure 10:
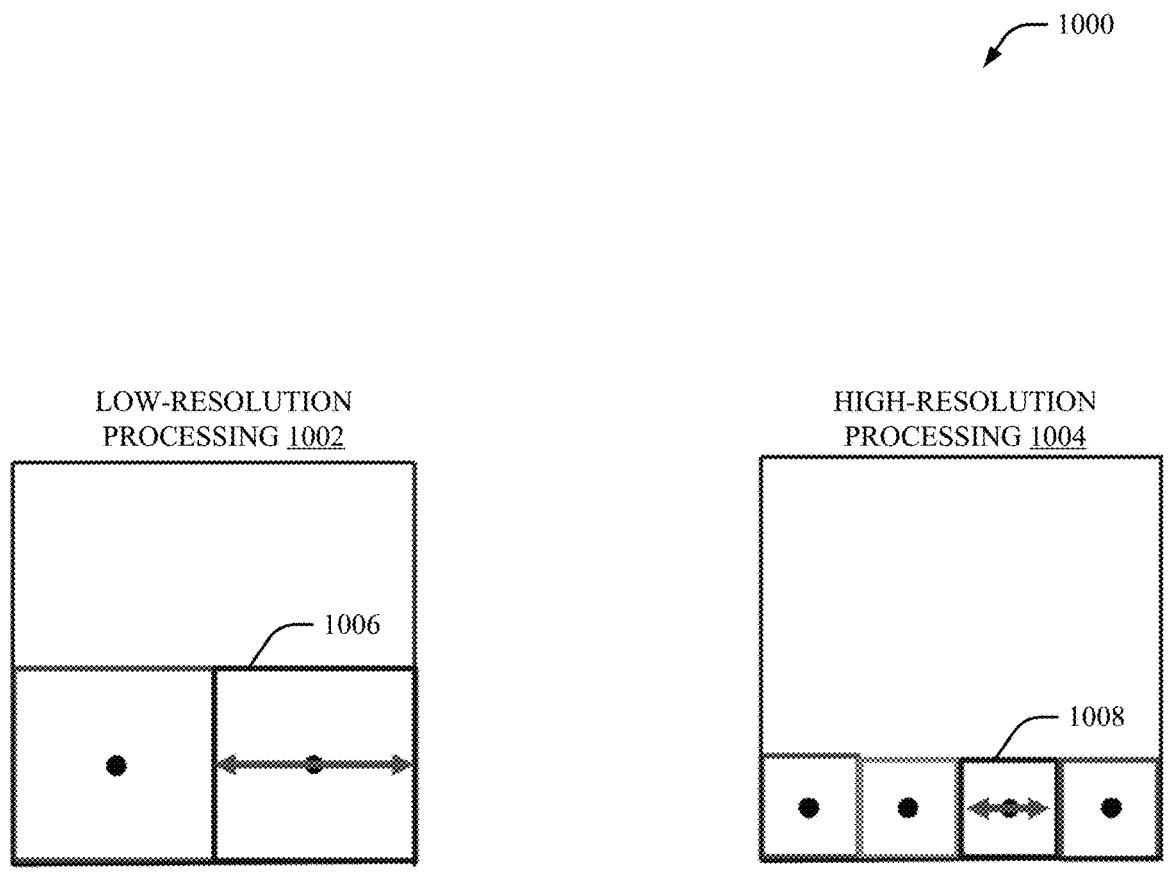
FIG. 10 illustrates a system associated with adaptive resolution for a density image, in accordance with one or more embodiments described herein.

FIG. 10 illustrates a system 1000 in accordance with one or more embodiments of the disclosure. Repetitive description of like elements described in other embodiments herein is omitted for sake of brevity. The system 1000 illustrates adaptive resolution for a density image. For instance, the system 1000 include low-resolution processing 1002 performed by the point cloud component 104 and high-resolution processing 1004 performed by the point cloud component 104 to facilitate adaptively setting resolution of a density image. In an embodiment, the point cloud component 104 can employ adaptive resolution for a density image to minimize a number of void regions in a density image. For example, to obtain a reduced number of void regions, larger data bins can be employed to provide a lower resolution density image since larger data bins can collect more points per bin, resulting in fewer empty data bins. Alternatively, smaller data bins can collect fewer points per bin, resulting in an increased number of empty data bins and an increased number of void regions for a higher resolution density image. In an aspect, the low-resolution processing 1002 can employ a data bin 1006 that comprises a larger size (e.g., a larger width) than a data bin 1008 employed by the high-resolution processing 1004. In another aspect, the point cloud component 104 can dynamically compute resolution to minimize a number of void regions in a density image. For example, the point cloud component 104 can dynamically select between the low-resolution processing 1002 and the high-resolution processing 1004 to provide an improved density image for improved segmentation and/or improved accuracy of calculated dimensions for an object.

Figure 11:
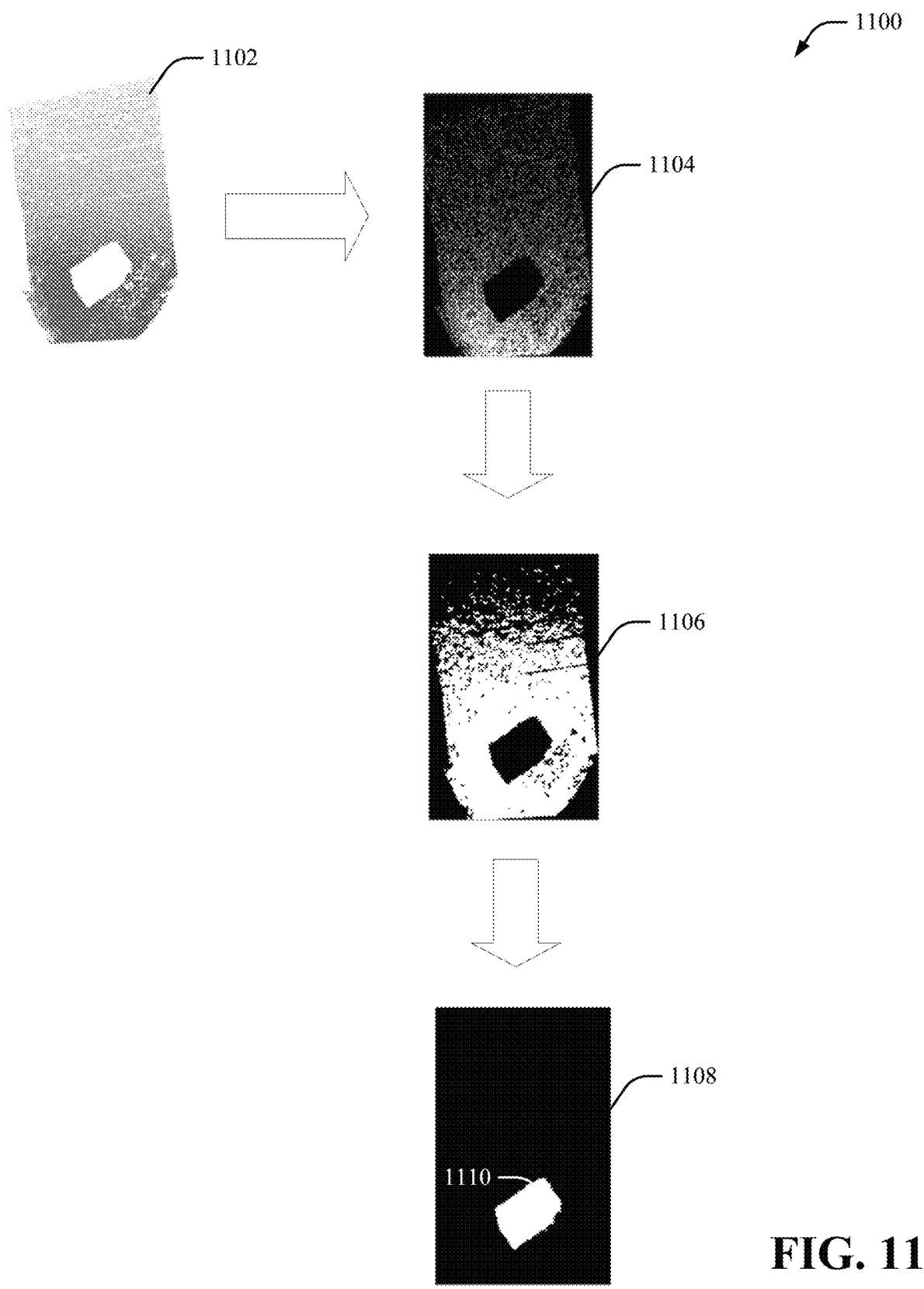
FIG. 11 illustrates a system associated with void segmentation, in accordance with one or more embodiments described herein.

FIG. 11 illustrates a system 1100 in accordance with one or more embodiments of the disclosure. Repetitive description of like elements described in other embodiments herein is omitted for sake of brevity. The system 1100 illustrates a void segmentation process performed by the point cloud component 104 and/or the segmentation component 106. The system 1100 includes point cloud data 1102 that represents a ground plane point cloud related to a scene that includes an object. The point cloud data 1102 is converted into a density image 1104 via the void segmentation process. For example, point in a 3D point cloud in a ground plane can be selected and converted to an image of point density. The density image 1104 can be converted into a smoothed density image 1106, in certain embodiments. The smoothed density image 1106 can be a smoothed version of the density image 1104 where one or more portions associated with irregularities are modified. The smoothed density image 1106 can also include more pronounced non-void regions as compared to void regions. The void segmentation process can also convert the smoothed density image 1106 into a segment void 1108. The segment void 1108 can include a segmented void region 1110 that can correspond to dimensions of an object.

Figure 12:
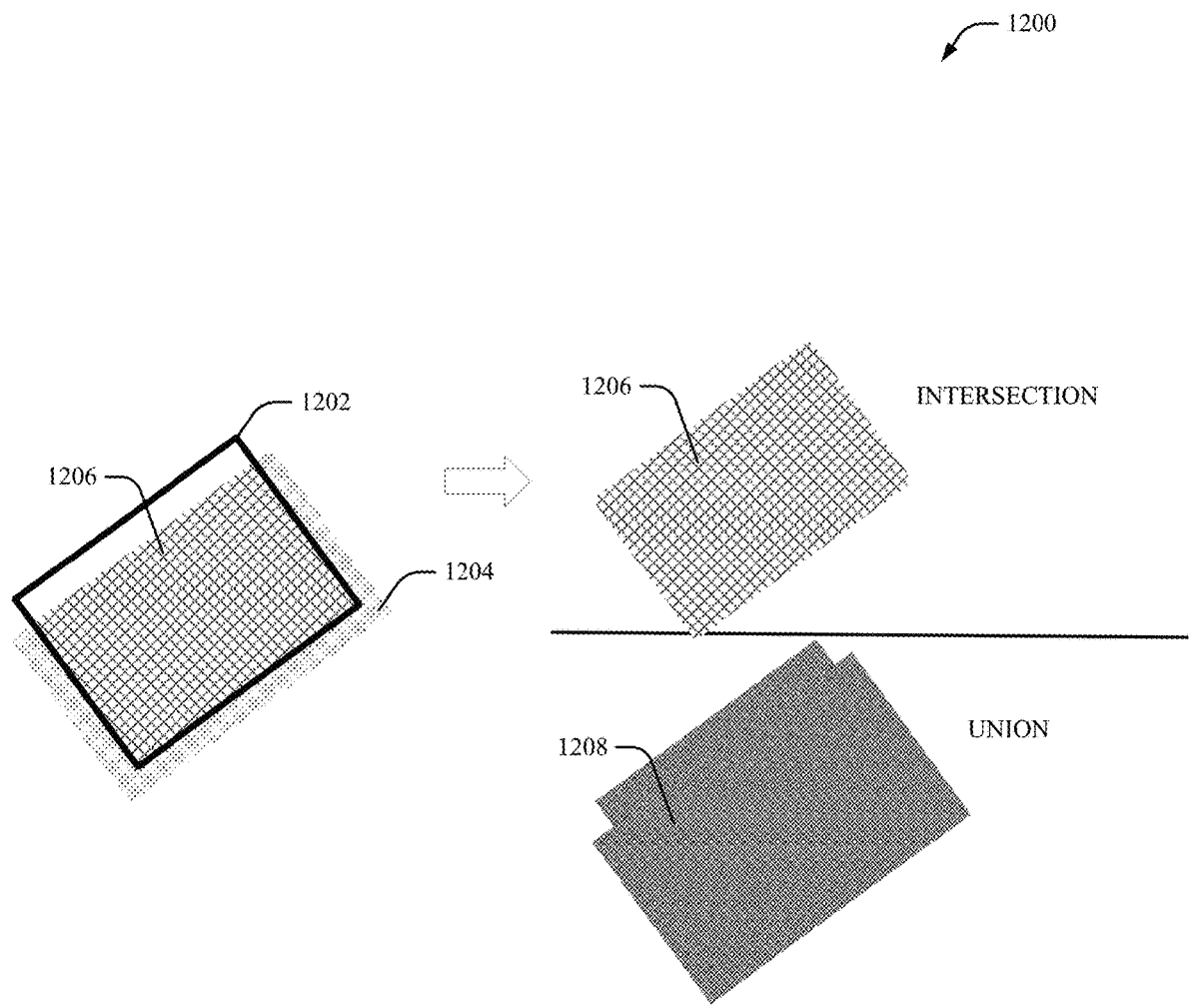
FIG. 12 illustrates a system associated with an Intersection over Union technique, in accordance with one or more embodiments described herein.

FIG. 12 illustrates a system 1200 in accordance with one or more embodiments of the disclosure. Repetitive description of like elements described in other embodiments herein is omitted for sake of brevity. The system 1200 illustrates an Intersection over Union (IoU) technique employed by the estimation component 108 to measures an agreement of dimensions between void regions. The system 1200 can include a segmented void region 1202 determined by the segmentation component 106. The system 1200 can also include a predicted void region 1204 determined by the estimation component 108. In an embodiment, the IoU technique can be employed by the estimation component 108 to determine an intersection 1206 between the segmented void region 1202 and the predicted void region 1204. The intersection 1206 can represent an intersection area between the segmented void region 1202 and the predicted void region 1204. The IoU technique can also be employed by the estimation component 108 to determine a union 1208 between the segmented void region 1202 and the predicted void region 1204. The union 1208 can represent a total area between the segmented void region 1202 and the predicted void region 1204. The IoU technique performed by the estimation component 108 can maximize the intersection 1206 over the union 1208 between the segmented void region 1202 and the predicted void region 1204 in order to provide an optimal calculation of dimensions for an object associated with the segmented void region 1202 and the predicted void region 1204. For example, the IoU technique performed by the estimation component 108 can maximize the ratio of area of intersection divided by area of union.

FIG. 13 illustrates a computer-implemented method 1300 for facilitating dimensioning of an object in accordance with one or more embodiments described herein. Repetitive description of like elements described in other embodiments herein is omitted for sake of brevity. The computer-implemented method 1300 can be associated with the dimensioning system 102, for example. In one or more embodiments, the computer-implemented method 1300 begins with converting, by a device comprising a processor, point cloud data associated with an object into a density image for a scene associated with the object (block 1302). In an embodiment, the converting comprises converting the point cloud data into the density image based on a first data bin associated with a first size and a second data bin associated with a second size that is different than the first size. The computer-implemented method 1300 further includes segmenting, by the device, the density image to determine a void region in the density image that corresponds to the object (block 1304). Furthermore, the computer-implemented method 1300 includes determining, by the device, dimension data for the object based on the void region for the density image (block 1306). In certain embodiments, the computer-implemented method 1300 can further include selecting, by the device, a subset of the point cloud data associated with a first plane that is different than a second plane related to a bottom surface of the object. The computer-implemented method 1300 can further include projecting, by the device, the subset of the point cloud data into the second plane to generate modified point cloud data associated with the object. The computer-implemented method 1300 can further include converting, by the device, the modified point cloud data into the density image. In certain embodiments, the computer-implemented method 1300 can further include modifying, by the device, a size of a data bin for the density image as a function of data point density of the point cloud data to generate a modified data bin for the density image. The computer-implemented method 1300 can further include converting, by the device, the point cloud data into the density image based on the modified data bin. In certain embodiments, the void region can be a first void region in the density image and the computer-implemented method 1300 can further include removing, by the device, a second void region from the density image based on a region of interest that is centered with respect to a center point of the density image. In certain embodiments, the computer-implemented method 1300 can further include modifying, by the device, the void region to generate a modified void region for the density image. The computer-implemented method 1300 can further include determining, by the device, dimension data for the object based on the modified void region for the density image.

Figure 14:
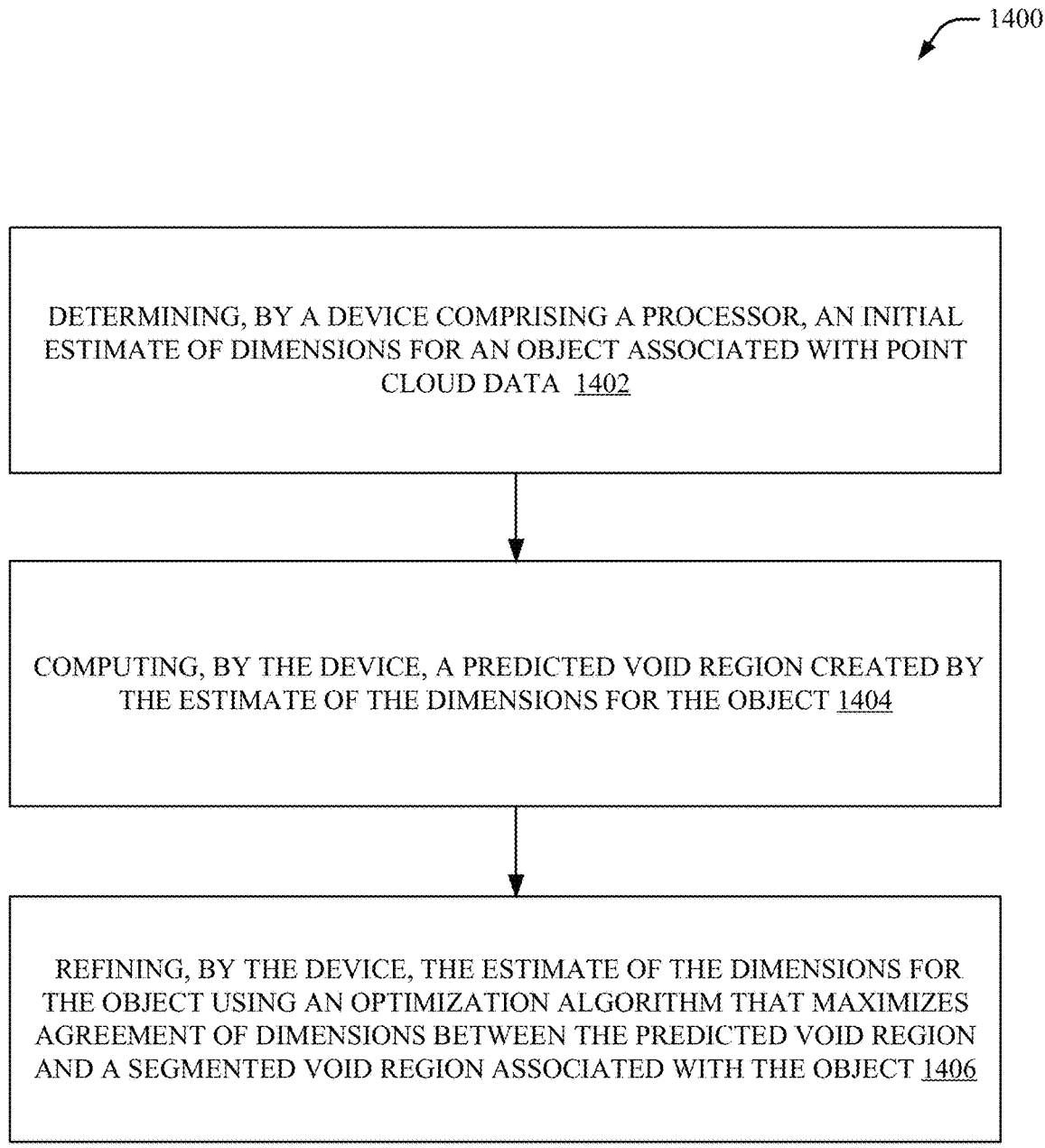
FIG. 14 illustrates a flow diagram for facilitating optimization-based estimation of dimensions of an object, in accordance with one or more embodiments described herein.

FIG. 14 illustrates a computer-implemented method 1400 for facilitating optimization-based estimation of dimensions of an object in accordance with one or more embodiments described herein. Repetitive description of like elements described in other embodiments herein is omitted for sake of brevity. The computer-implemented method 1400 can be associated with the dimensioning system 102, for example. In one or more embodiments, the computer-implemented method 1400 begins with determining, by a device comprising a processor, an initial estimate of dimensions for an object associated with point cloud data (block 1402). In an example, the estimate of the dimensions for the object can be parameterized with one or more variables such as length of the object, width of the object, height of the object, angle of the object, a coordinate position of a center of the object, and/or another dimension for the object. The computer-implemented method 1400 further includes computing, by the device, a predicted void region created by the estimate of the dimensions for the object (block 1404). In an example, a shadow of the object (e.g., as a result of a pattern of light being projected on the object via a pattern projector device) can be employed to compute the predicted void region. Furthermore, the computer-implemented method 1400 includes refining, by the device, the estimate of the dimensions for the object using an optimization algorithm that maximizes agreement of dimensions between the predicted void region and a segmented void region associated with the object (block 1406).

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A system, comprising:
a processor; and
a memory that stores executable instructions that, when executed by the processor, cause the processor to:
convert point cloud data associated with a parcel into a density image for a scene associated with the parcel;
modify a size of a data bin for the density image as a function of data point density of the point cloud data to generate a modified data bin for the density image;
convert the point cloud data into the density image based on the modified data bin;
segment the density image to determine a void region in the density image that corresponds to the parcel; and
determine, based on the void region for the density image, dimension data indicative of one or more dimensions of the parcel.

2. The system of claim 1, wherein the executable instructions further cause the processor to:
select a subset of the point cloud data associated with a first plane that is different than a second plane related to a bottom surface of the parcel;
project the subset of the point cloud data into the second plane to generate modified point cloud data associated with the parcel; and
convert the modified point cloud data into the density image.

3. The system of claim 1, wherein the processor converts the point cloud data into the density image based on a first data bin associated with a first size and a second data bin associated with a second size, and wherein the second size is different than the first size.

4. The system of claim 1, wherein the executable instructions further cause the processor to:
modify the void region to generate a modified void region for the density image; and
determine, based on the modified void region for the density image, the dimension data indicative of the one or more dimensions of the parcel.

5. The system of claim 1, wherein the void region is a first void region in the density image, and wherein the executable instructions further cause the processor to:
remove a second void region from the density image based on a region of interest that is centered with respect to a center point of the density image.

6. The system of claim 1, wherein the processor dynamically sets a resolution of respective portions of the density image to segment the density image.

7. The system of claim 1, wherein the processor modifies estimated dimensions of a predicted void region based on an optimization technique to generate an optimized version of the estimated dimensions for the parcel.

8. The system of claim 1, wherein the processor modifies a predicted void region for the parcel based on a comparison between the void region and the predicted void region.

9. The system of claim 1, wherein the executable instructions further cause the processor or one or more other processors to:
project a pattern of light onto the scene associated with the parcel via a pattern projector device;
capture an image associated with the scene associated with the parcel via an imaging device; and
process the image to generate the point cloud data, wherein the point cloud data comprises three-dimensional points on at least one surface related to the parcel.

10. The system of claim 1, wherein the dimension data comprises at least one of length data for the parcel, width data for the parcel, height data for the parcel, angle data for the parcel, and position data of the parcel.

11. A computer-implemented method, comprising:
converting, by a device comprising a processor, point cloud data associated with a parcel into a density image for a scene associated with the parcel;
modifying, by the device, a size of a data bin for the density image as a function of data point density of the point cloud data to generate a modified data bin for the density image;
converting, by the device, the point cloud data into the density image based on the modified data bin;
segmenting, by the device, the density image to determine a void region in the density image that corresponds to the parcel; and
determining, by the device, dimension data for the parcel based on the void region for the density image.

12. The computer-implemented method of claim 11, further comprising:
selecting, by the device, a subset of the point cloud data associated with a first plane that is different than a second plane related to a bottom surface of the parcel;
projecting, by the device, the subset of the point cloud data into the second plane to generate modified point cloud data associated with the parcel; and
converting, by the device, the modified point cloud data into the density image.

13. The computer-implemented method of claim 11, wherein the converting comprises converting the point cloud data into the density image based on a first data bin associated with a first size and a second data bin associated with a second size that is different than the first size.

14. The computer-implemented method of claim 11, wherein the void region is a first void region in the density image, and wherein the computer-implemented method further comprises:
removing, by the device, a second void region from the density image based on a region of interest that is centered with respect to a center point of the density image.

15. The computer-implemented method of claim 11, further comprising:
modifying, by the device, the void region to generate a modified void region for the density image; and
determining, by the device, dimension data for the parcel based on the modified void region for the density image.

16. A computer program product comprising at least one computer-readable storage medium having program instructions embodied thereon, the program instructions executable by a processor to cause the processor to:
convert point cloud data associated with a parcel into a density image for the parcel modify a size of a data bin for the density image as a function of data point density of the point cloud data to generate a modified data bin for the density image;
convert the point cloud data into the density image based on the modified data bin;

segment the density image to determine a void region in the density image that corresponds to the parcel; and determine, based on the void region for the density image, dimension data indicative of one or more dimensions of the parcel.

17. The computer program product of claim 16, wherein the program instructions are executable by the processor to cause the processor to:

select a subset of the point cloud data associated with a first plane that is different than a second plane related to a surface of the parcel;

project the subset of the point cloud data into the second plane to generate modified point cloud data associated with the parcel; and convert the modified point cloud data into the density image for the parcel.

* * * * *